United States Patent
Egenter et al.

(10) Patent No.: US 12,348,052 B2
(45) Date of Patent: Jul. 1, 2025

(54) DEVICE FOR WIRELESSLY TRANSFERRING POWER TOWARD A CONSUMER BY WAY OF INDUCTIVE COUPLING

(71) Applicant: E.G.O. Elektro-Geraetebau GmbH, Oberderdingen (DE)

(72) Inventors: Christian Egenter, Bretten (DE); Ulrich Waechter, Bruchsal (DE); Max-Felix Mueller, Oberderdingen (DE); Mathias Bellm, Ubstadt-Weiher (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 23 days.

(21) Appl. No.: 18/474,430

(22) Filed: Sep. 26, 2023

(65) Prior Publication Data
US 2024/0120774 A1   Apr. 11, 2024

(30) Foreign Application Priority Data
Oct. 5, 2022   (DE) .................. 10 2022 210 534.6

(51) Int. Cl.
*H02J 50/10*   (2016.01)
*H05B 6/12*   (2006.01)

(52) U.S. Cl.
CPC ............ *H02J 50/10* (2016.02); *H05B 6/1236* (2013.01)

(58) Field of Classification Search
CPC .............................. H02J 50/10; H05B 6/1236
(Continued)

(56) References Cited

U.S. PATENT DOCUMENTS 5,648,008 A * 7/1997 Barritt .................... H05B 6/062
  219/661
5,700,996 A * 12/1997 Lee ........................ H05B 6/062
  219/626
(Continued)

FOREIGN PATENT DOCUMENTS

DE   102005050035 A1   7/2007
DE   102009047185 B4   10/2012
EP      3836352 A1    6/2021

OTHER PUBLICATIONS

Extended European Search Report Mailed on Mar. 1, 2024 for EP Application No. 23198573, 14 page(s).
(Continued)

*Primary Examiner* — Alfonso Perez Borroto
(74) *Attorney, Agent, or Firm* — ALSTON & BIRD LLP

(57) ABSTRACT

A device (100) for wirelessly transferring power toward a consumer (200) by way of inductive coupling, wherein the device (100) has:
  a rectifier (101) for generating a DC voltage (UG) from a line voltage (UN),
  an inverter (102) which is configured to generate a pulse-width-modulated drive signal (AS), and
  a power coil (103) driven by way of the pulse-width-modulated drive signal (AS), which power coil can generate an alternating magnetic field for power transfer and for measurement purposes,
  wherein, in a first operating mode, the inverter (102) is configured to generate the pulse-width-modulated drive signal (AS) for power transfer as a function of the DC voltage (UG), and
  wherein, in a second operating mode, the inverter is configured to generate the pulse-width-modulated drive signal (AS) for measurement purposes depending on a measurement voltage (UM), wherein the DC voltage
(Continued)

(UG) is greater than the measurement voltage (UM) during the second operating mode.

12 Claims, 3 Drawing Sheets

(58) Field of Classification Search
USPC .......................................................... 307/104
See application file for complete search history.

(56) References Cited

U.S. PATENT DOCUMENTS

| | | | |
|---|---|---|---|
| 10,085,303 B2 | 9/2018 | Schilling et al. | |
| 2007/0084857 A1* | 4/2007 | Osaka | H05B 6/062 |
| | | | 219/660 |
| 2007/0221668 A1* | 9/2007 | Baarman | H05B 6/1236 |
| | | | 219/746 |
| 2008/0203087 A1 | 8/2008 | Schilling et al. | |
| 2011/0120989 A1* | 5/2011 | Schilling | H05B 6/062 |
| | | | 219/661 |
| 2014/0348987 A1* | 11/2014 | Cheng | A47J 27/08 |
| | | | 99/331 |
| 2018/0295679 A1* | 10/2018 | Kwag | H05B 6/062 |
| 2019/0342953 A1* | 11/2019 | Nam | H05B 6/1254 |
| 2021/0186249 A1* | 6/2021 | Nam | H05B 6/1272 |
| 2023/0043246 A1 | 2/2023 | Ettes et al. | |

OTHER PUBLICATIONS

German Patent and Trademark Office, Office Action received for Application No. 102022210534.6, dated Aug. 22, 2023, 10 pages, Germany.

* cited by examiner

DEVICE FOR WIRELESSLY TRANSFERRING POWER TOWARD A CONSUMER BY WAY OF INDUCTIVE COUPLING

CROSS-REFERENCE TO RELATED APPLICATIONS

This application claims priority to German Application No. 10 2022 210 534.6, filed Oct. 5, 2022, the contents of which are hereby incorporated herein in its entirety by reference.

SUMMARY

The object of the present invention is to provide a device for wirelessly transferring power toward a consumer by way of inductive coupling and/or for heating an item of cookware by way of inducing eddy currents, by way of which operationally relevant measured values can be obtained as simply and reliably as possible.

The device according to the invention is configured to wirelessly transfer power toward a consumer by way of inductive coupling and/or to heat an item of cookware by way of inducing eddy currents. The consumer may be for example a conventional, inductively heatable item of cookware and/or an electrical consumer which is supplied with electrical power by way of inductive coupling, which is also known as wireless power transfer (WPT). Reference is also made to the relevant specialist literature with regard to the basic principles of WPT. The device may for example form an induction heating unit and/or be operated in accordance with the WPC (Wireless Power Consortium) Ki (cordless kitchen) method.

The device has a conventional single- or multiphase rectifier for generating a DC voltage or DC-link voltage from an in particular sinusoidal line voltage.

The device further comprises an inverter which is configured to generate a pulse-width-modulated drive signal. The inverter may for example be a half-bridge inverter or a full-bridge inverter.

The device further has a power coil driven by way of the pulse-width-modulated drive signal, which power coil can generate an alternating magnetic field for power transfer and for measurement purposes. The drive signal may for example be a drive voltage.

In a first operating mode, the inverter is configured to generate the pulse-width-modulated drive signal as a function of or from the DC voltage for power transfer. In the first operating mode, the drive signal typically has an operating point dependent on a power setpoint or suited to the power setpoint. An operating point here denotes in particular one or more characteristics of the drive signal, for example amplitude, duty factor and/or frequency of the drive signal.

In a second operating mode, the inverter is configured to generate the pulse-width-modulated drive signal for measurement purposes depending on or from a measurement voltage, wherein, during the second operating mode, the DC voltage is preferably always greater than the measurement voltage.

In one embodiment, the inverter has a first semiconductor switching means, a second semiconductor switching means and a third semiconductor switching means, for example in each case in the form of an IGBT. The first semiconductor switching means and the second semiconductor switching means are looped in in series between a first circuit node and a second circuit node, wherein the DC voltage is present between the first circuit node and the second circuit node and wherein a connecting node of the first semiconductor switching means and of the second semiconductor switching means is electrically connected to the power coil. The third semiconductor switching means and the first semiconductor switching means are looped in in series between a third circuit node and the second circuit node, wherein the measurement voltage is present between the third circuit node and the second circuit node. A reference potential, for example ground, may be present at the second circuit node.

For the purposes of the present application, a circuit node is in particular taken to mean electrically interconnected circuit components which carry an identical potential.

In one embodiment, the inverter has a decoupling diode, wherein the third semiconductor switching means, the decoupling diode and the first semiconductor switching means are looped in in series between the third circuit node and the second circuit node.

In one embodiment, the inverter has a fourth semiconductor switching means, wherein the third semiconductor switching means, the fourth semiconductor switching means and the first semiconductor switching means are looped in in series between the third circuit node and the second circuit node.

In one embodiment, during the first operating mode for generating the pulse-width-modulated drive signal, a switching state of the first semiconductor switching means and of the second semiconductor switching means is continuously modified.

In one embodiment, a switching state of the third semiconductor switching means remains unmodified during the first operating mode.

In one embodiment, during the second operating mode for generating the pulse-width-modulated drive signal, a switching state of the first semiconductor switching means and of the third semiconductor switching means is continuously modified and a switching state of the second semiconductor switching means remains unmodified.

In one embodiment, the measurement purposes comprise determining characteristics of objects in the active region of the generated magnetic field of the power coil.

In one embodiment, the objects are items of cookware, wherein, according to the invention, their size and material are for example determinable.

In one embodiment, the measurement purposes comprise determining a transfer function. In particular, the transfer function characterizes an electrical power over frequency transferable by way of the device toward the consumer.

In one embodiment, the measurement purposes comprise determining a characteristic frequency, wherein a specified phase angle between a voltage present at the power coil and a current flowing through the power coil is present at the characteristic frequency.

In one embodiment, currents and/or voltages and/or a phase angle between the currents and voltages are evaluated for the measurement purposes.

In one embodiment, in the second operating mode, sensors in the active region of the alternating magnetic field are supplied with operating power.

Inverters for inductive transfer of electrical power, for example for domestic appliances, are typically supplied with line voltage, wherein the line voltage is rectified. The subsequent DC link requires a link capacitor for short-circuiting the HF currents of the inverter. The link capacitor is conventionally selected somewhat small, such that the DC-link voltage follows line voltage in pulsating manner. Given sufficiently high power transfer, the DC link is almost completely discharged at zero crossover, such that, in a time interval around the zero crossovers, a lower, usually constant, independent measurement voltage can be generated or fed in which is coupled back out via a diode at higher DC-link voltages. In this respect, reference is made for example to DE 10 2009 047 185 B4.

Using the constant, lower measurement voltage in the region of the zero crossovers, it is possible to implement sensor functions for coverage of the induction heating coil by suitably driving the inverter and measuring current and/or voltage through or at the induction heating coil. For example, the degree of coverage by an item of cookware or a temperature change of the cookware may accordingly be measured without a significant change in transferred power. A low measurement voltage is in particular advantageous for low-impedance sensors in the region of their resonant frequency since the currents which arise may be very large.

In the case of an inverter for inductively supplying a cordless consumer, the measurement voltage may, for example, generate an excitation for object detection, by way of which it is possible to detect metallic objects over the power coil which must be removed by the user before power transfer since these objects could otherwise be unintentionally heated to elevated temperatures. In this respect, reference is made for example to EP 3 836 352 A1.

The invention makes it possible, even at elevated DC-link voltages or an insufficiently discharged DC link, to drive the power coil with the measurement voltage and so enable a measurement function at a low voltage level. Thanks to the invention, it is in particular not necessary to actively discharge the DC link to a level of less than or equal to the measurement voltage. Before starting up the first operating mode, the DC link is conventionally charged with the amplitude of the line voltage. Even in the case of operation at low powers, the DC link is not sufficiently discharged which is why active discharge before the second operating mode is necessary in the prior art. The invention makes it possible to dispense with the components of a corresponding discharge circuit and save the losses they cause.

BRIEF DESCRIPTION OF THE DRAWINGS

The invention is described in greater detail below with reference to the drawings, in which.

DETAILED DESCRIPTION

Figure 1:
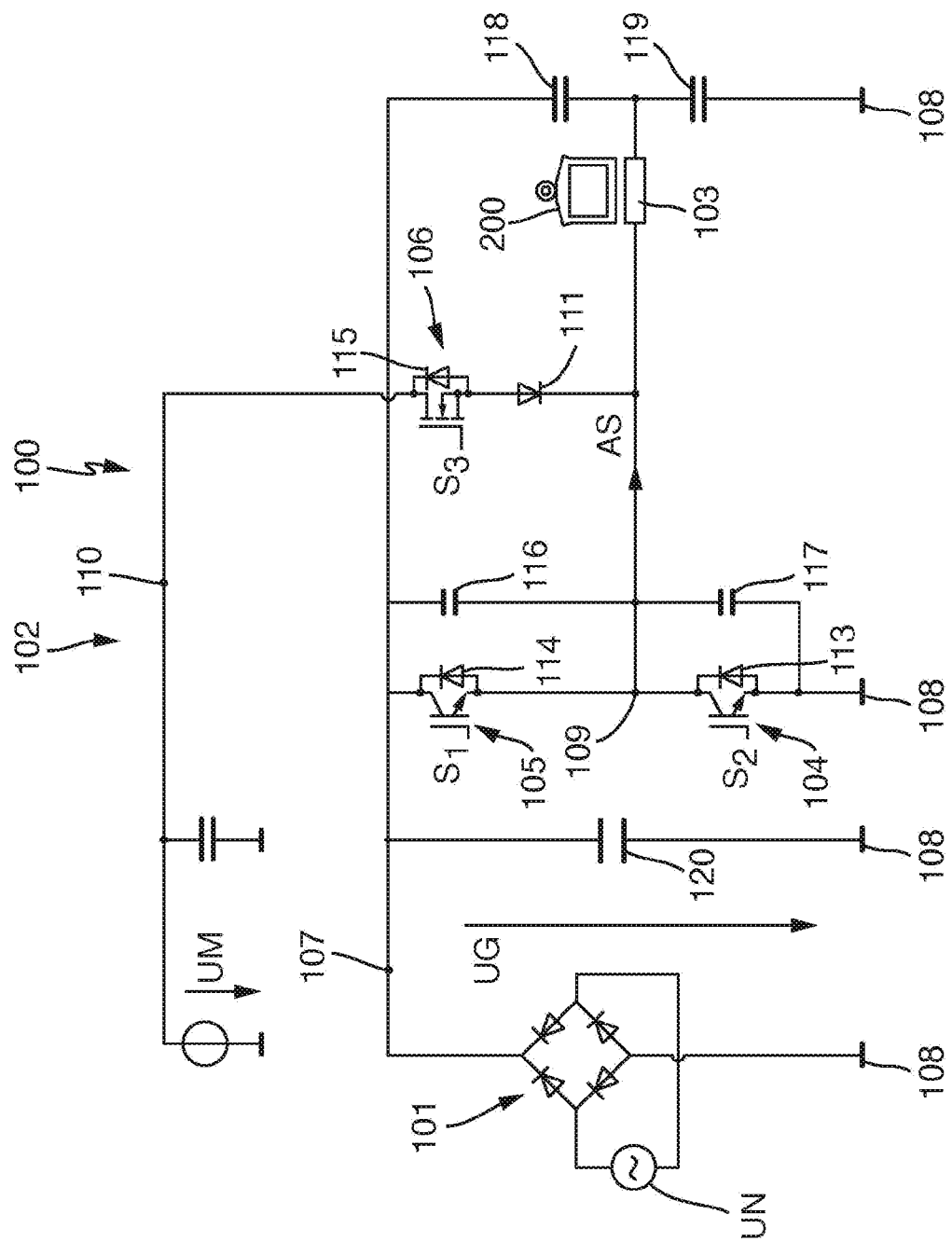
FIG. 1 shows a circuit diagram of a device for wirelessly transferring power toward a consumer by way of inductive coupling according to a first embodiment.

FIG. 1 shows a device 100 for wirelessly transferring power toward a consumer 200 in the form of an inductively heatable item of cookware by way of inductive coupling. The device 100 may form an induction heating unit.

The device 100 has a conventional bridge rectifier 101 for generating a DC voltage or DC-link voltage buffered by way of a link capacitor 120 from a sinusoidal line voltage UN, an inverter 102 which is configured to generate a pulse-width-modulated drive signal AS, and a power coil 103 driven by way of the pulse-width-modulated drive signal AS, which power coil can generate an alternating magnetic field for power transfer and for measurement purposes. The power coil 103 may be a conventional induction heating coil.

In a first operating mode, the inverter 102 is configured to generate the pulse-width-modulated drive signal AS for power transfer as a function of the voltage UG and, in a second operating mode, is configured to generate the pulse-width-modulated drive signal AS depending on a measurement voltage UM for measurement purposes, wherein the DC voltage UG is greater than the measurement voltage UM during the second operating mode. The measurement voltage UM may for example be in a voltage range between 5 V and 40 V. The measurement voltage UM is independent of the DC voltage UG.

The inverter 102 has a first semiconductor switching means 104 driven by a signal S2, a second semiconductor switching means 105 driven by a signal S1 and a third semiconductor switching means 106 driven by a signal S3.

The first semiconductor switching means 104 and the second semiconductor switching means 105 are looped in in series between a first circuit node 107 and a second circuit node 108, wherein the DC voltage UG is present between the first circuit node 107 and the second circuit node 108 and wherein a connecting node 109 of the first semiconductor switching means 104 and of the second semiconductor switching means 105 is electrically connected to the power coil 103.

The third semiconductor switching means 106 and the first semiconductor switching means 104 are looped in in series between a third circuit node 110 and the second circuit node 108, wherein the measurement voltage UM is present between the third circuit node 110 and the second circuit node 108.

Freewheeling diodes 113, 114 and 115 are connected in parallel to the semiconductor switching means 104, 105 and 106 respectively.

A snubber capacitor 116 is connected in parallel to the semiconductor switching means 105 and a snubber capacitor 117 is connected in parallel to the semiconductor switching means 104.

Capacitors 118 and 119 are looped in in series between the first circuit node 107 and the second circuit node 108. The power coil 103 is looped in between connecting node 109 of the first semiconductor switching means 104 and of the second semiconductor switching means 105 and a connecting node of capacitors 118 and 119.

The inverter 102 furthermore has a decoupling diode 111, wherein the third semiconductor switching means 106, the decoupling diode 111 and the first semiconductor switching means 104 are looped in in series between the third circuit node 110 and the second circuit node 108.

Figure 3:
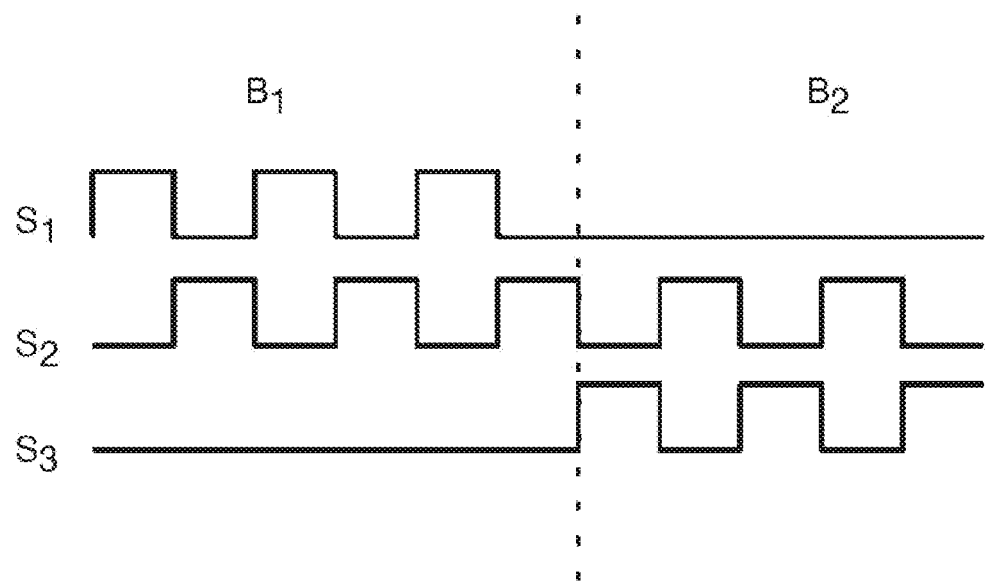
FIG. 3 shows a time profile of drive signals of semiconductor switching means of the embodiment shown in FIG. 1.

FIG. 3 shows a time profile of drive signals S1 to S3 of semiconductor switching means 105, 104 and 106 respectively.

As shown, during the first operating mode B1 for generating the pulse-width-modulated drive signal AS, a switching state of the first semiconductor switching means 104 and of the second semiconductor switching means 105 is continuously modified. During the first operating mode B1, a switching state of the third semiconductor switching means 106 remains unmodified.

During the second operating mode B2 for generating the pulse-width-modulated drive signal AS, a switching state of the first semiconductor switching means 104 and of the third semiconductor switching means 106 is continuously modified and a switching state of the second semiconductor switching means 105 remains unmodified.

Figure 2:
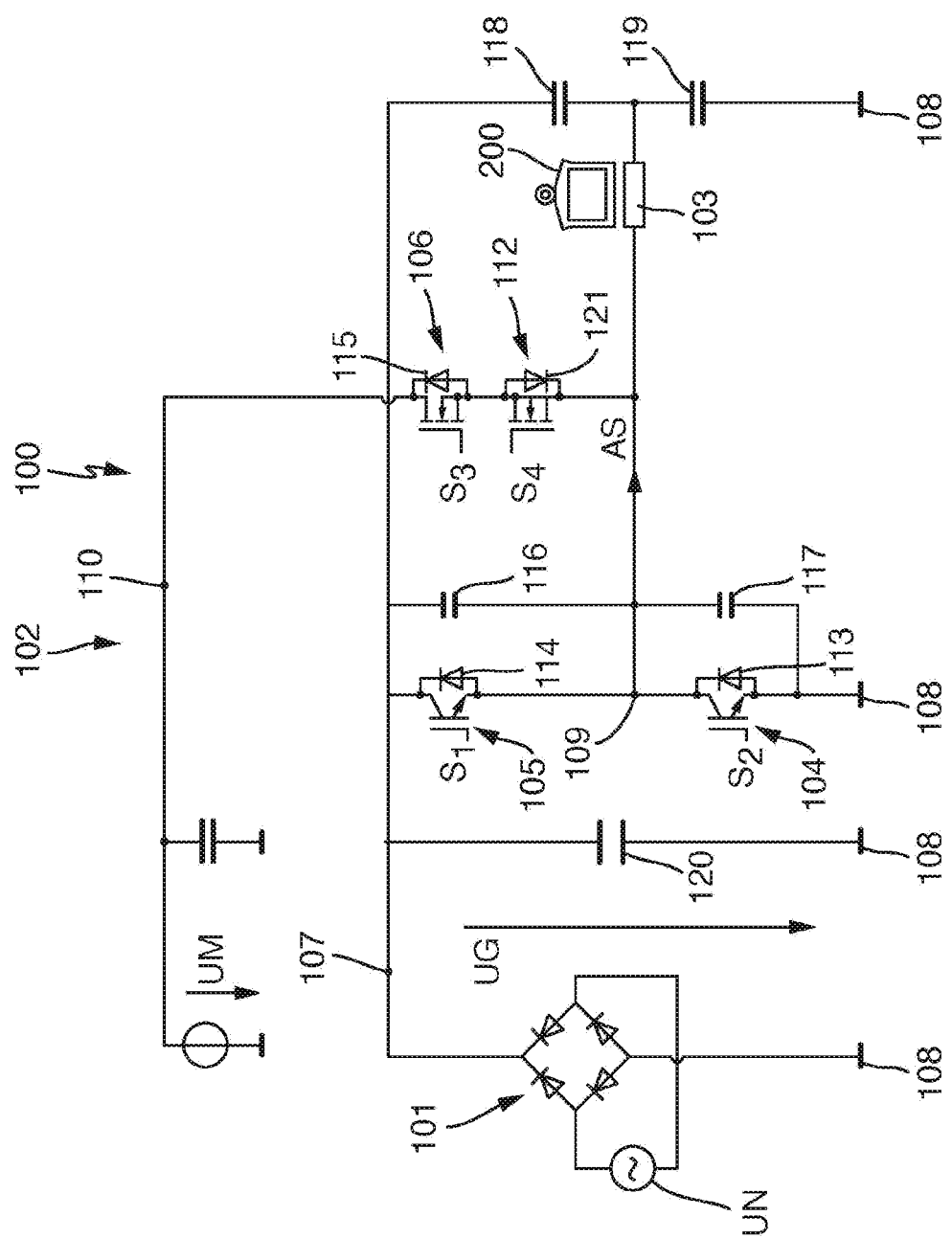
FIG. 2 shows a circuit diagram of a device for wirelessly transferring power toward a consumer by way of inductive coupling according to a second embodiment.

FIG. 2 shows a circuit diagram of a device 100 for wirelessly transferring power toward the consumer 200 by way of inductive coupling according to a second embodiment.

The decoupling diode 111 of the embodiment shown in FIG. 1 is supplemented by a fourth semiconductor switching means 112 which is driven by way of a fourth drive signal S4, wherein the third semiconductor switching means 106, the fourth semiconductor switching means 112 and the first semiconductor switching means 104 are looped in in series between the third circuit node 110 and the second circuit node 108. A freewheeling diode 121 is connected in parallel to the fourth semiconductor switching means 112. The fourth semiconductor switching means 112 enables a freewheeling current for the measurement voltage UM.

Figure 4:
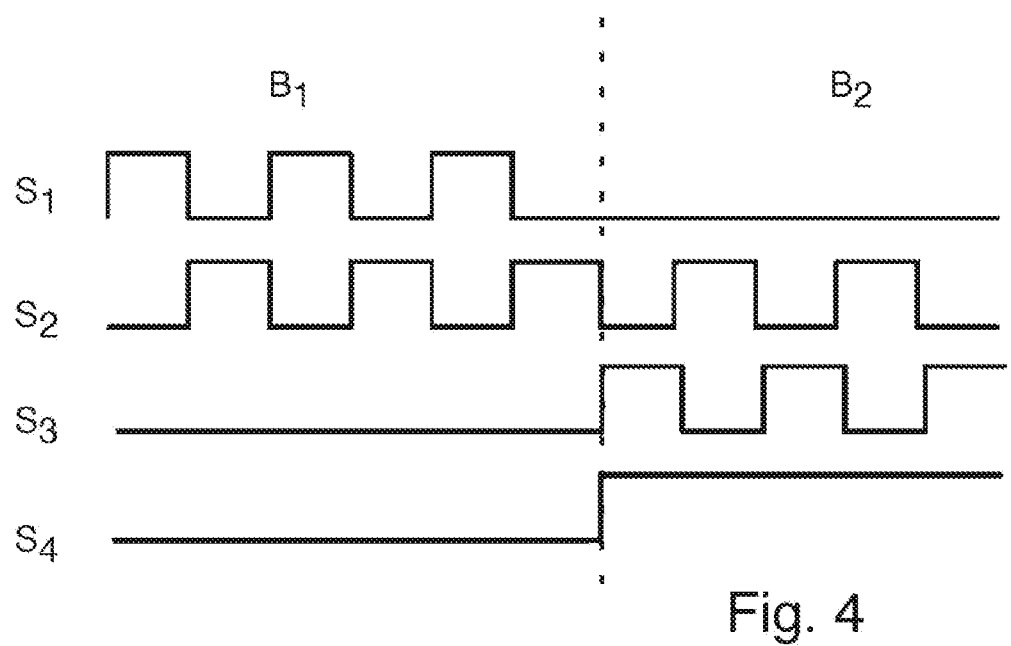
FIG. 4 shows a time profile of drive signals of semiconductor switching means of the embodiment shown in FIG. 2.

FIG. 4 shows a time profile of drive signals S1 to S4 of semiconductor switching means 105, 104, 106 and 112 respectively. Drive signal S4 is permanently inactive during the first operating mode B1, i.e. the fourth semiconductor switching means 112 is in blocking mode. Drive signal S4 is permanently active during the second operating mode B2, i.e. the fourth semiconductor switching means 112 is in conduction mode.

According to the invention, link capacitor 120 need not be discharged for measurement purposes. Instead, the power coil 103 is supplied with the measurement voltage UM via the additional semiconductor switching means 106 in series with the decoupling diode 111 or the fourth semiconductor switching means 112. This allows measurements with power coil 103 also to be made at a high DC voltage or DC-link voltage UG.

Conventionally, measurements with the measurement voltage can only be performed in short time intervals around the zero crossovers of the line voltage UN, provided the DC link has previously been discharged. Discharge proceeds automatically through the inverter provided sufficiently high power is given off at the power coil 103. If, however, only little or no power is given off at the power coil 103, the link capacitor 120 is not discharged or at least not completely so. Conventionally, the DC link then has to be discharged before or at the beginning of the measurement.

The device according to the invention 100 has a transmitter coil or power coil 103, in particular in the form of an induction heating coil for heating an item of cookware 200 by way of inducing eddy currents, and/or for cordless power transfer to a consumer. The power coil 103 can be used both for transferring electrical power and for determining characteristics of objects in the active region of the generated alternating magnetic field of the power coil 103.

The first operating mode B1 serves for heating the cookware 200 and/or transferring power to an electrical consumer, for example by way of WPT.

The second operating mode B2 serves for determining characteristics of objects in the active region of the generated alternating magnetic field of the power coil 103.

The second operating mode B2 can be set, providing the DC voltage UG is greater than the measurement voltage UM.

The semiconductor switching means 104 is switched in both operating modes B1 and B2. In the first operating mode B1, semiconductor switching means 104 forms a half-bridge with semiconductor switching means 105 and, in the second operating mode B2, a half-bridge with semiconductor switching means 106.

Further inverters which are not shown can be supplied from the DC link or the link capacitor 120, wherein one of the inverters can be operated in the first operating mode and, simultaneously, the other inverter in the second operating mode.

In the embodiment shown in FIG. 1, decoupling diode 111 is provided in series with semiconductor switching means 106, such that the measurement voltage UM remains decoupled from the DC link in the first operating mode. Freewheeling diode 115 is therefore not absolutely necessary. The prevented freewheeling current for the measurement voltage UM may alternatively commutate onto the snubber capacitors 116 and 117, so increasing the voltage at node 109 of the half-bridge. If the voltage reaches the level of the DC-link voltage UG, the freewheeling diode 114 prevents any further increase in voltage. As soon as the sign of the current through the power coil 103 reverses, the voltage of the snubber capacitor 116 and 117 falls to the level of the measurement voltage UM, such that current can then be fed in from the measurement voltage UM via the semiconductor switching means 106 and the decoupling diode 111. The described commutation effect by the prevented freewheeling current brings about a brief increase in bridge voltage at node 109, i.e. the average bridge voltage also increases depending on the freewheeling current.

If this effect is to be prevented, a semiconductor switching means 112 arranged inversely to semiconductor switching means 106 can be added in parallel to the freewheeling or decoupling diode 111 or 121 as in the embodiment shown in FIG. 2, such that the freewheeling current through the freewheeling diode 115 can be directly fed into the measurement voltage UM.

Semiconductor switching means 105 and 106 are as it were parallel and connect power coil 103 to the DC voltage or DC-link voltage UG or to the measurement voltage UM. Both switching means have substantially the bridge voltage as reference potential, i.e. they can be inexpensively switched with a common drive signal and by a common driver, wherein either both switching means or at least driving of semiconductor switching means 105 must be disconnectable such that said means remains blocked for measurement operation or the second operating mode.

The invention claimed is:

1. A device (100) for wirelessly transferring power toward a consumer (200) by way of inductive coupling and/or for heating an item of cookware (200) by way of inducing eddy currents, wherein the device (100) comprises:
a rectifier (101) for generating a DC voltage (UG) from a line voltage (UN),
an inverter (102) which is configured to generate a pulse-width-modulated drive signal (AS), and
a power coil (103) driven by way of the pulse-width-modulated drive signal (AS), which power coil is configured to generate an alternating magnetic field for power transfer and for measurement purposes,
wherein:
the inverter comprises: a first semiconductor switching means (104), a second semiconductor switching means (105), and a third semiconductor switching means (106),
in a first operating mode (B1), the inverter (102) is configured to generate the pulse-width-modulated drive signal (AS) for power transfer as a function of the DC voltage (UG),
in a second operating mode (B2), the inverter is configured to generate the pulse-width-modulated drive signal (AS) for measurement purposes depending on a measurement voltage (UM), wherein the DC voltage (UG) is higher than the measurement voltage (UM) during the second operating mode, the first semiconductor switching means (104) and the second semiconductor switching means (105) are looped in in series between a first circuit node (107) and a second circuit node (108), wherein the DC voltage (UG) is present between the first circuit node (107) and the second circuit node (108) and wherein a connecting node (109) of the first semiconductor switching means (104) and of the second semiconductor switching means (105) is electrically connected to the power coil (103), and the third semiconductor switching means (106) and the first semiconductor switching means (104) are looped in in series between the third circuit node (110) and the second circuit node (108), wherein the measurement voltage (UM) is present between the third circuit node (110) and the second circuit node (108).

2. The device (100) of claim 1, wherein the inverter (102) further comprises a decoupling diode (111), wherein the third semiconductor switching means (106), the decoupling diode (111) and the first semiconductor switching means (104) are looped in in series between the third circuit node (110) and the second circuit node (108).

3. The device (100) of claim 1, wherein the inverter (102) further comprises a fourth semiconductor switching means (112), wherein the third semiconductor switching means (106), the fourth semiconductor switching means (112) and the first semiconductor switching means (104) are looped in in series between the third circuit node (110) and the second circuit node (108).

4. The device (100) of claim 1, wherein during the first operating mode for generating the pulse-width-modulated drive signal (AS), a switching state of the first semiconductor switching means (104) and of the second semiconductor switching means (105) is continuously modified.

5. The device (100) of claim 4, wherein, during the first operating mode, a switching state of the third semiconductor switching means (106) remains unmodified.

6. The device (100) of claim 1, wherein, during the second operating mode for generating the pulse-width-modulated drive signal (AS), a switching state of the first semiconductor switching means (104) and of the third semiconductor switching means (106) is continuously modified and a switching state of the second semiconductor switching means (105) remains unmodified.

7. The device (100) of claim 1, wherein the measurement purposes comprise determining characteristics of objects in the active region of the generated magnetic field of the power coil (103).

8. The device (100) of claim 7, wherein the objects are items of cookware (200).

9. The device (100) of claim 1, wherein the measurement purposes comprise determining a transfer function, wherein the transfer function characterizes an electrical power over frequency transferable by way of the device (100) toward electrical consumer (200).

10. The device (100) of claim 1, wherein the measurement purposes comprise determining a characteristic frequency, wherein a specified phase angle between a voltage present at the power coil (103) and a current flowing through the power coil (103) prevails at the characteristic frequency.

11. The device (100) of claim 1, wherein currents and/or voltages and/or a phase angle between the currents and voltages are evaluated for the measurement purposes.

12. The device (100) of claim 1, wherein, in the second operating mode, sensors in the active region of the alternating magnetic field are supplied with operating power.

* * * * *